United States Patent
Joung et al.

(10) Patent No.: US 8,722,261 B2
(45) Date of Patent: May 13, 2014

(54) RECYCLER FOR DIRECT METHANOL FUEL CELL AND METHOD OF OPERATING THE SAME

(75) Inventors: Young-soo Joung, Anseong-si (KR); Hye-jung Cho, Anyang-si (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 1220 days.

(21) Appl. No.: 12/045,900

(22) Filed: Mar. 11, 2008

(65) Prior Publication Data
US 2009/0087703 A1 Apr. 2, 2009

(30) Foreign Application Priority Data
Sep. 28, 2007 (KR) .................. 10-2007-0098373

(51) Int. Cl.
*H01M 8/04* (2006.01)
*H01M 8/10* (2006.01)
*B01D 47/16* (2006.01)

(52) U.S. Cl.
USPC ............ 429/415; 429/447; 95/187; 95/261; 95/270; 96/216

(58) Field of Classification Search
CPC ........................................... H01M 8/04
USPC ............... 429/415, 479, 482–483, 502, 506, 429/512–513, 515; 95/260–261, 185, 198, 95/270; 96/355, 359, 217
See application file for complete search history.

(56) References Cited

U.S. PATENT DOCUMENTS

| | | | |
|---|---|---|---|
| 6,205,379 B1 * | 3/2001 | Morisawa et al. | 701/22 |
| 7,316,855 B2 | 1/2008 | Lawrence et al. | |
| 2003/0232226 A1 * | 12/2003 | Morishima et al. | 429/24 |
| 2004/0166389 A1 * | 8/2004 | Matsuoka et al. | 429/26 |
| 2004/0185314 A1 * | 9/2004 | Miyamoto et al. | 429/22 |

(Continued)

FOREIGN PATENT DOCUMENTS

| | | |
|---|---|---|
| CN | 1725537 A | 1/2006 |
| JP | 63-158108 A | 7/1998 |

(Continued)

OTHER PUBLICATIONS

Machine Translation JP 2006-331876 (Dec. 2006).*

(Continued)

*Primary Examiner* — Jonathan Crepeau
*Assistant Examiner* — Jacob Buchanan
(74) *Attorney, Agent, or Firm* — Lee & Morse, P.C.

(57) ABSTRACT

A recycler for a direct methanol fuel cell (DMFC) that uses methanol as a direct feed fuel includes: a housing in which a gas-liquid mixture recovered from a stack is accommodated; a rotor rotatably mounted in the housing; and a motor to rotate the rotor, wherein, when the rotor is rotated by the motor, a phase separation occurs such that liquid in the gas-liquid mixture is collected mainly in an outer region of the housing and gas is collected in the center region of the housing due to the centrifugal force. Accordingly, as it is unnecessary to align a liquid outlet port of the housing with a gravitational direction, the recycler can be employed in a mobile apparatus whose orientation occasionally changes. Also, the recycler does not use a membrane whose performance is rapidly reduced over time so that effective performance can be maintained for a long operation time.

22 Claims, 7 Drawing Sheets

(56) References Cited

U.S. PATENT DOCUMENTS

| | | | |
|---|---|---|---|
| 2006/0019143 A1* | 1/2006 | Muramatsu et al. | 429/34 |
| 2006/0064954 A1* | 3/2006 | Yokota et al. | 55/406 |
| 2006/0222923 A1* | 10/2006 | Muramatsu et al. | 429/34 |
| 2006/0288870 A1 | 12/2006 | Kang et al. | |
| 2007/0077470 A1 | 4/2007 | Adams et al. | |
| 2007/0077482 A1 | 4/2007 | Kibune et al. | |
| 2009/0169965 A1 | 7/2009 | Watanabe et al. | |

FOREIGN PATENT DOCUMENTS

| | | | | |
|---|---|---|---|---|
| JP | 2003-080114 A | | 3/2003 | |
| JP | 2003080114 | * | 3/2003 | H01M 8/10 |
| JP | 2006-508516 A | | 3/2006 | |
| JP | 2006331876 A | * | 12/2006 | H01M 8/04 |
| JP | 2007-026892 A | | 2/2007 | |
| JP | 2007-087674 A | | 4/2007 | |
| JP | 2007-95591 A | | 4/2007 | |
| WO | WO 2007/060866 A1 | | 5/2007 | |

OTHER PUBLICATIONS

Machine Translation JP 2003-080114 (Mar. 2003).*
European Search Report in EP 08162809.1-2119/2043186, dated Dec. 6, 2010 (Joung, et al.).
Chinese First Office Action in CN 200810161794.4, dated Apr. 23, 2012 (Joung, et al.).
Chinese Office Action Dated Dec. 4, 2012.
Chinese Patent Application No. 200810161794.4 Rejection Decision dated Apr. 11, 2013.

* cited by examiner

RECYCLER FOR DIRECT METHANOL FUEL CELL AND METHOD OF OPERATING THE SAME

CROSS-REFERENCE TO RELATED APPLICATIONS

This application claims the benefit of Korean Patent Application No. 2007-98373, filed on Sep. 28, 2007, in the Korean Intellectual Property Office, the disclosure of which is incorporated herein by reference.

BACKGROUND OF THE INVENTION

1. Field of the Invention

Aspects of the present invention relate to a recycler for a direct methanol fuel cell (DMFC), which uses methanol as a fuel, to recycle unreacted methanol recovered from a stack and $H_2O$, and a method of operating the same.

2. Description of the Related Art

A fuel cell is an electric generator that changes chemical energy of a fuel into electrical energy through a chemical reaction. The fuel cell continuously generates electricity as long as fuel is supplied. Of the fuel cells, a direct methanol fuel cell (DMFC) is an apparatus that uses methanol as a fuel to generate electricity through a reaction between the fuel directly fed to an anode and oxygen supplied to a cathode of the DMFC. In the anode of the DMFC, electrons are generated through Chemical Reaction 1 as indicated below, and the electrons move to the cathode along a moving path and generate $H_2O$ through Chemical Reaction 2 as indicated below. When a load is applied to the moving path, work can be done using the generated electricity.

$CH_3OH+H_2O \leftrightarrow CO_2+6H^++6e^-$  [Chemical Reaction 1]

$3/2O_2+6H^++6e^- \leftrightarrow 3H_2O$  [Chemical Reaction 2]

Methanol can be supplied to the anode by pumping liquid state methanol, and such DMFC is referred to as an active type DMFC. Or, vaporized methanol may be induced to flow into the anode as methanol vaporizes at room temperature, and such DMFC is referred to as a passive type DMFC. Here, an active type DMFC will be described.

FIG. 1 is a functional block diagram of the configuration of an active DMFC. A single assembly of an anode and a cathode, where the Chemical Reactions 1 and 2 occur, cannot generate a sufficient voltage of electricity, and thus, a stack 20, formed by stacking a plurality of the single assemblies, is used. In the stack 20, a plurality of unit cells are stacked such that in each of the unit cells, an anode and a cathode are formed respectively on opposite sides of an electrolyte membrane, and thus, a large power is output by adding the electricity generated from each of the unit cells. The active DMFC includes an air pump 60 to supply air as a source of oxygen to the cathode and a cartridge 30 where methanol to be supplied to the anode is stored. In the cartridge 30, high concentration methanol, for example, 100% methanol, is stored. Also, the active DMFC includes a storage tank 70 to store a diluted fuel, having a concentration of 0.5 to 2M, to be supplied to the anode of the stack 20 through a supply pump 50. The diluted fuel is made by adding water to the high concentration methanol supplied from the cartridge 30 through a fuel pump 40 to obtain the diluted fuel with a concentration of 0.5 to 2M.

The active DMFC includes a heat exchanger 80 to decrease the temperature of a gas-liquid mixture discharged from the stack 20. That is, the heat exchanger 80 condenses steam in the gas-liquid mixture discharged from the stack 20 by decreasing the high temperature of the gas-liquid mixture. Also, the active DMFC includes a recycler 10 to recycle unreacted methanol that is discharged from the stack 20 after having generated electricity and $H_2O$, which is a by-product from the electricity generation reaction. The recycler 10 is also referred to as a gas-liquid separator since the recycler 10 separates unreacted methanol and water (by-product) from the gas-liquid mixture recovered from the stack 20 to reuse the unreacted methanol and water to dilute the high concentration methanol. Instead of including the recycler 10, low concentration methanol can be stored in the cartridge 30. However, in such case, the capacity of the cartridge 10 must be very large. Thus, as described above, high concentration methanol is stored in the cartridge 30 and then is gradually supplied to the storage tank 70 to be diluted.

FIGS. 2A and 2B are cross-sectional views of the structure of the conventional recyclers 10 employed in the active DMFC of FIG. 1. In the conventional recycler 10a of FIG. 2A, a gas and liquid are separated by gravity; that is, the gas is discharged through an upper port 11a of a housing 11 and the liquid, which is denser than the gas, is discharged through a lower port 11b of the housing 11. The liquid includes methanol that did not react in the stack 20, and water produced as a by-product, and the gas includes air supplied as an oxygen source and $CO_2$ generated from a chemical reaction at the anode. The separated liquid is appropriately mixed with high concentration methanol supplied to the storage tank 70 from the cartridge 30, so as to have an appropriate low concentration methanol needed at the stack 20 for electricity generation, and as described above, the mixture is re-supplied to the stack by the supply pump 50. The structure of the recycler 10a of FIG. 2A has an advantage of structural simplicity as recycler 10a uses gravity to function; however, the lower port 11b, through which the liquid is discharged, must be disposed in the direction of gravity. Thus, recycler 10a is limited by the direction of gravity. Active DMFCs are more commonly being used in various mobile apparatuses, and as such, the lower port 11b of the conventional recycler 10a may be moved such that the lower port 11b is disposed in a direction opposite to the direction of gravity when the mobile apparatus is being used. In such case, the conventional recycler 10a cannot appropriately perform the function of gas-liquid separation.

The structure of FIG. 2B is of another conventional recycler 10b that is designed to address the above problem. That is, as depicted in FIG. 2B, the conventional recycler 10b does not use gravity to function, instead, a hydrophobic membrane 12a is installed in one port of a housing 12 and a hydrophilic membrane 12b is installed in another port of the housing 12 so that gas can be discharged through the hydrophobic membrane 12a and liquid can be discharged through the hydrophilic membrane 12b. In this way, the gas-liquid separation can be achieved regardless of the direction of gravity, and thus, the active DMFC can be applied to a mobile apparatus. However, as time passes, the characteristics of the hydrophobic and hydrophilic membranes 12a and 12b, degrade leading to a liquid leakage, and thus, the recycler 10b having the hydrophobic and hydrophilic membranes 12a and 12b are difficult to commercialize the active DMFC.

Accordingly, there is a need to develop a new recycler structure that can perform an efficient gas-liquid separation function regardless of the direction of gas-liquid separation and without using materials such as membranes of which the performances rapidly degrade over time.

SUMMARY OF THE INVENTION

Aspects of the present invention provide a DMFC having a recycler that can be used regardless of its orientation and can effectively maintain performance for a long period of time.

According to an aspect of the present invention, there is provided a recycler for a direct methanol fuel cell (DMFC), the recycler comprising: a housing in which a gas-liquid mixture recovered from a stack is accommodated; a rotor rotatably mounted in the housing; and a motor to rotate the rotor, wherein, when the rotor is rotated by the motor, a phase separation occurs such that liquid in the gas-liquid mixture is mainly in an outer region of the housing due to a centrifugal force and gas is collected in the center region of the housing.

According to an aspect of the present invention, the housing may comprise: a first inlet port through which the gas-liquid mixture enters; a second inlet port through which high concentration methanol enters to replenish fuel to the stack; and a gas outlet port for discharging gas collected in the center region of the housing; and a liquid outlet port for discharging liquid gathered in the outer region of the housing.

According to an aspect of the present invention, a discharge path connected to the gas outlet port may comprise bending portions to change the direction of the gas. According to an aspect of the present invention, a portion of a main body of the motor may be installed partially in the housing.

According to an aspect of the present invention, a gap between an inner wall of the housing and an outer circumference of the rotor may be formed sufficiently narrow to a level of 0.2 to 1 mm.

According to an aspect of the present invention, the rotor corresponds to the inside surfaces of the housing. The rotor may include a plurality of holes formed to extend therethrough.

According to an aspect of the present invention, the housing may be formed of a metal, and may have a thickness of 0.2 to 0.5 mm. According to an aspect of the present invention, the housing may include fins and/or a cooling fan on the outside the housing to increase cooling efficiency.

According to an aspect of the present invention, the recycler may further comprise a level sensor to measure a liquid level in the housing and a gravitational direction detection sensor to detect a gravitational direction of the housing.

According to another aspect of the present invention, there is provided a method of operating a recycler for a DMFC, comprising: preparing a recycler comprising a housing in which a gas-liquid mixture recovered from a stack is separated by centrifugal force applied to the gas-liquid mixture by a rotor rotatably mounted in the housing or by gravity, and a gravitational direction detection sensor to detect a gravitational direction of the housing; detecting whether the discharge direction of a liquid outlet port is aligned with a gravitation direction using the gravitational direction detection sensor; and rotating the rotor to apply centrifugal force to the gas-liquid mixture if the discharge direction of the liquid outlet port is not sufficiently aligned with the gravitational direction.

According to an aspect of the present invention, the method may further comprise discharging gas separated from the gas-liquid mixture by opening a gas outlet port provided in the center region of the housing and discharging liquid separated from the gas-liquid mixture by opening a liquid outlet port provided in an outer region of the housing.

According to an aspect of the present invention, the method may further comprise discharging the gas that has left from the gas outlet port along a discharge path that is bent at least once.

According to an aspect of the present invention, the method may further comprise detecting a liquid level in the housing to determine whether the liquid level is suitable for a normal operation using a level sensor to measure the liquid level in the housing before opening the liquid outlet port.

Additional aspects and/or advantages of the invention will be set forth in part in the description which follows and, in part, will be obvious from the description, or may be learned by practice of the invention.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE EMBODIMENTS

Figure 1:
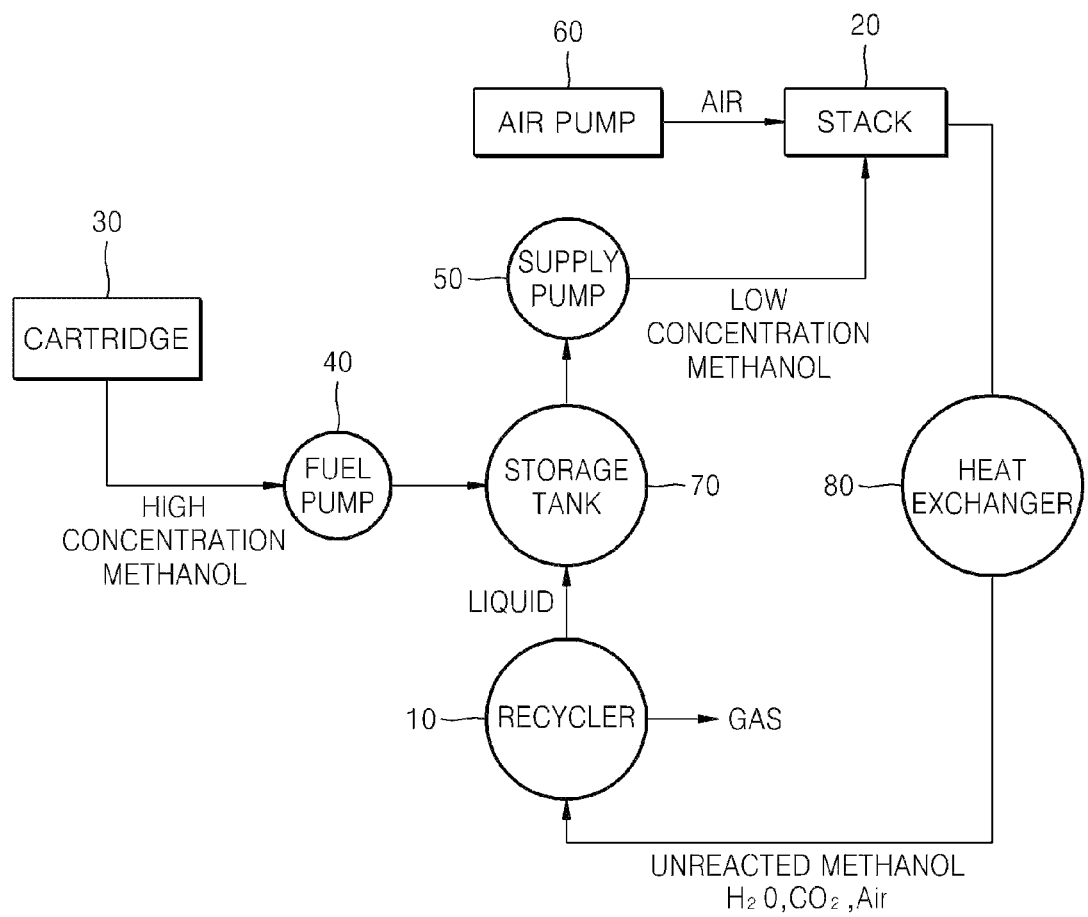
FIG. 1 is a functional block diagram of the configuration of a conventional active direct methanol fuel cell (DMFC)
Figure 2A:
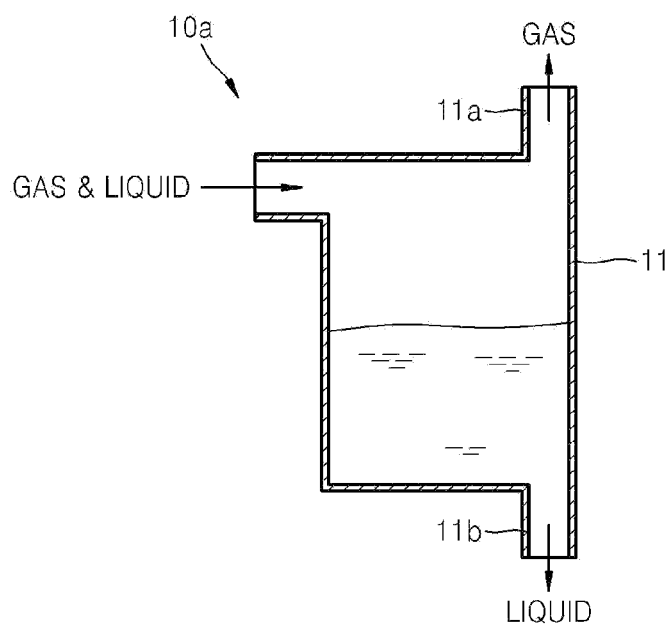
FIGS. 2A and 2B are schematic cross-sectional views of conventional recyclers employed in the active DMFC of FIG. 1.
Figure 2B:
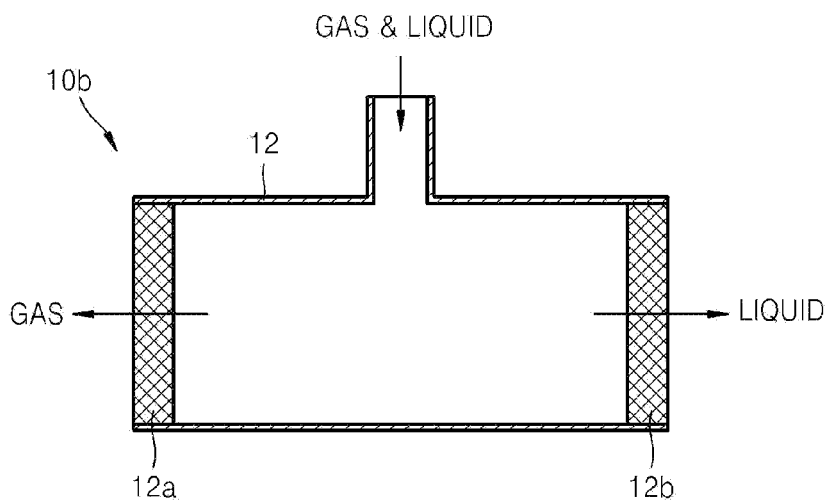

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
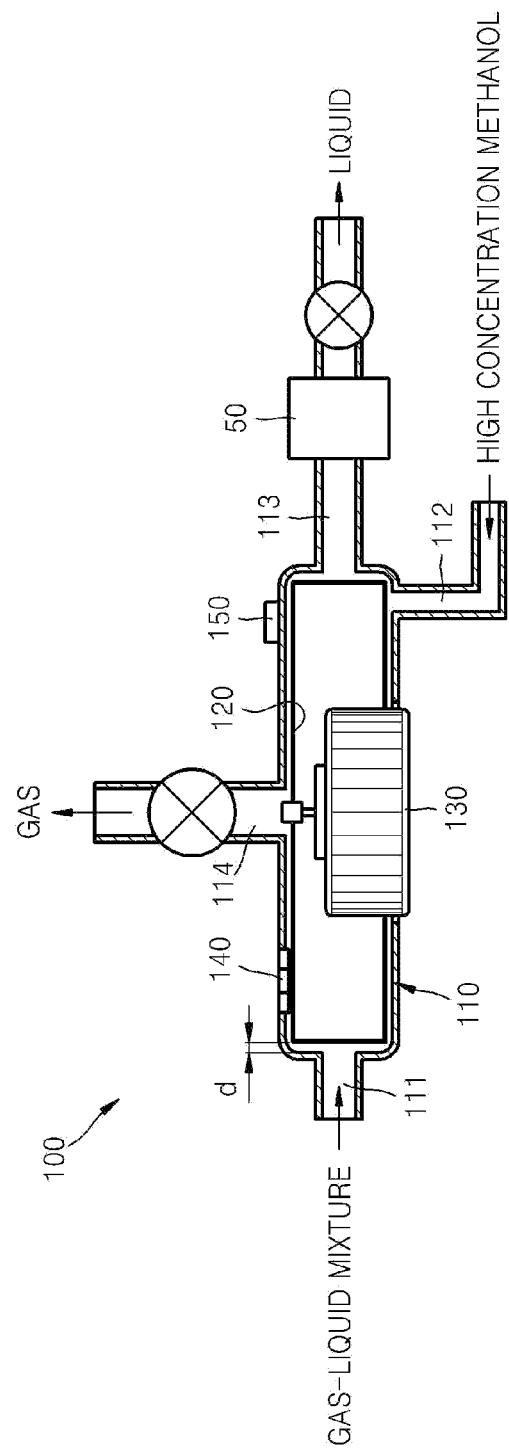
FIG. 3 is a schematic cross-sectional view of a structure of a recycler for a direct methanol fuel cell (DMFC), according to an embodiment of the present invention.
Figure 4A:
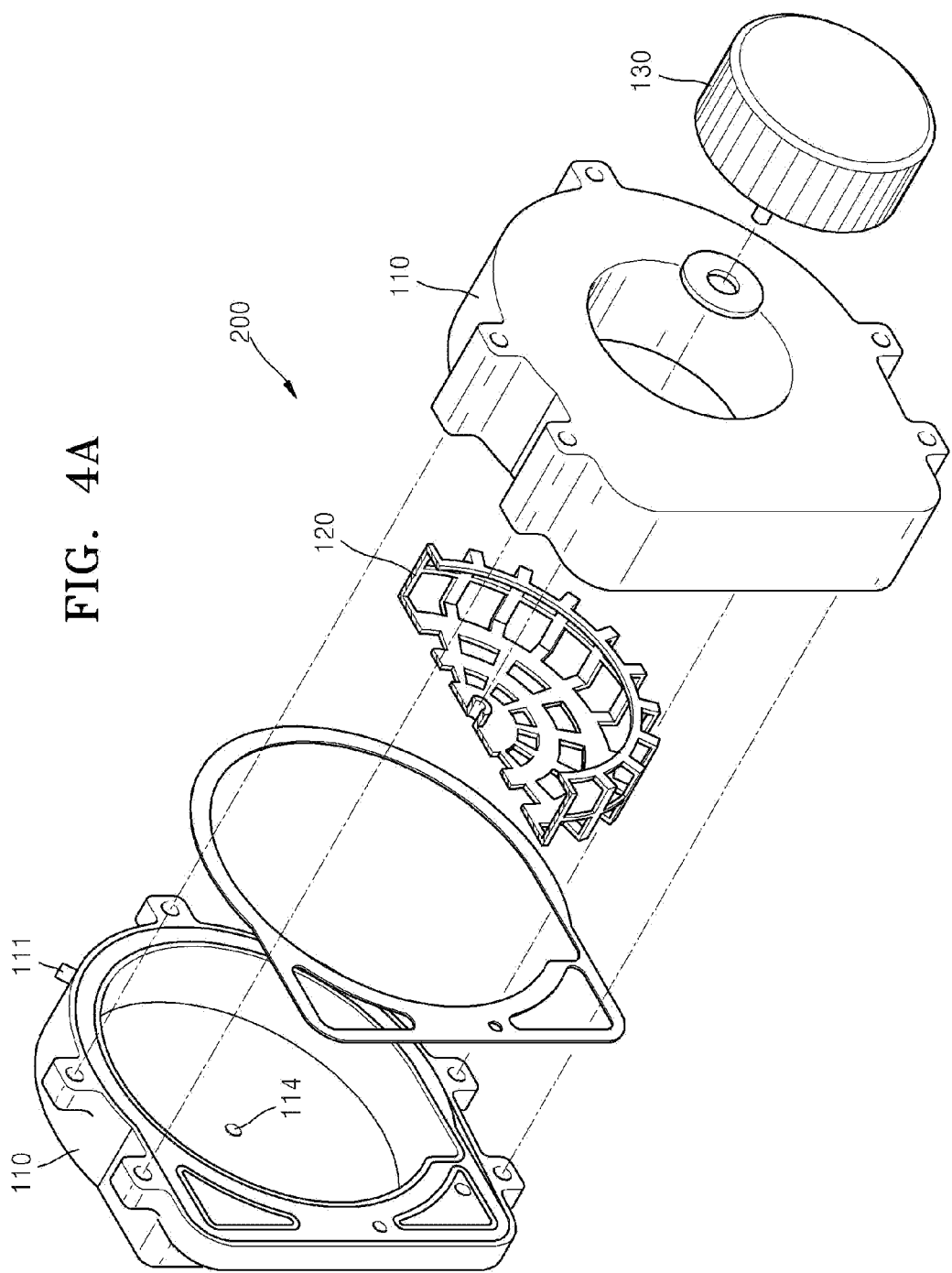
FIGS. 4A and 4B are respectively an exploded perspective view showing parts of the recycler and a perspective view of a combined state of the recycler of FIG. 3.
Figure 4B:
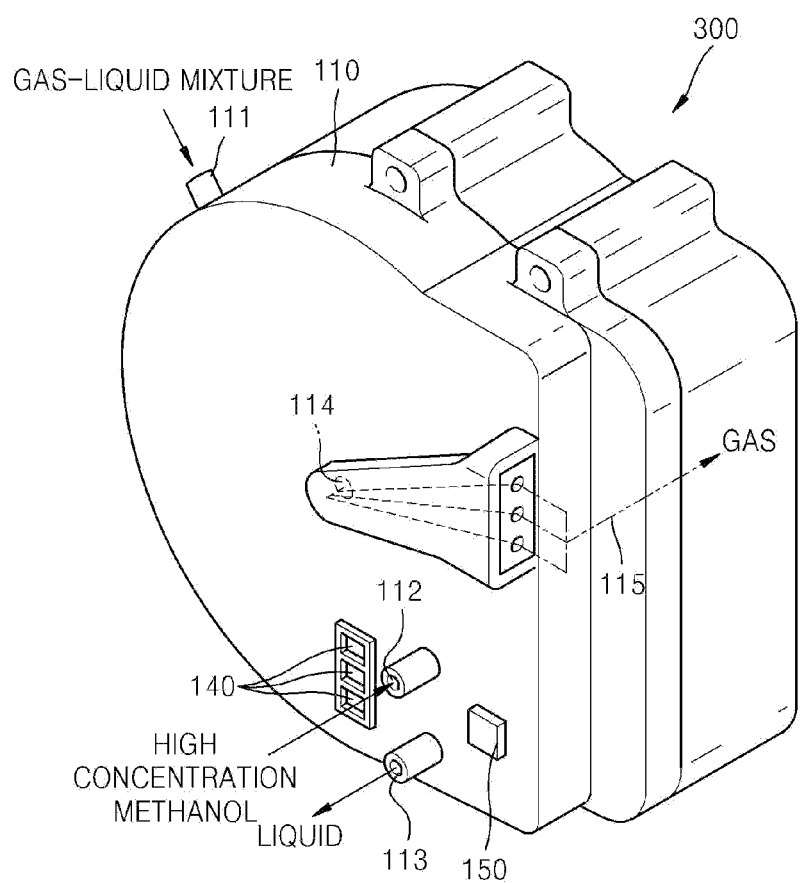

FIG. 3 is a schematic cross-sectional view of a structure of a recycler 100 for a direct methanol fuel cell (DMFC), according to an embodiment of the present invention. FIGS. 4A and 4B are respectively an exploded perspective view showing parts of the recycler 100 and a perspective view of a combined state of the recycler 100 of FIG. 3. Referring to FIGS. 3, 4A, and 4B, the recycler 100 for a DMFC according to an embodiment of the present invention includes a housing 110, a rotor 120 rotatably mounted in the housing 110 and corresponding to the inside surfaces of the housing 110, and a motor 130 that rotates the rotor 120. That is, the recycler 100 does not separate gas and liquid by gravity or membranes but instead has a configuration in which gas and liquid are separated using a centrifugal force generated by rotating the rotor 120. Here, a portion of the motor 130 is inserted into the housing 110 to reduce an overall volume of the recycler 100, but the recycler 100 is not limited thereto such that the motor 130 need not be inserted into the housing 110. Further, the recycler 100 is not limited to rotating the rotor 120 with the motor 130, but the rotor 120 may be rotated by other mechanical devices or by manual manipulation.

As shown in FIG. 3, the housing 110 is of a generally cylindrical shape having two generally parallel and flat surfaces, the gas outlet port 114 is centrally disposed in one of the two surfaces and the motor 130 is centrally disposed in the other of the two surface, and a side that connects to the peripheries of the two generally parallel and flat surfaces. The housing 110 includes a first inlet port 111 through which a gas-liquid mixture recovered from the stack 20 (refer to FIG.

1) enters, a second inlet port 112 through which high concentration methanol (for example 100% methanol) supplied from the cartridge 30 (refer to FIG. 1) enters to replenish fuel to be sent to the stack 20, and a liquid outlet port 113 through which a liquid is discharged, and a gas outlet port 114 through which a gas is discharged once separated from the gas-liquid mixture. The first inlet port 111, the second inlet port 112, and the liquid outlet port may be located generally in the side of the housing 110, but such locations are not limited thereto. For example, as shown in FIG. 3, the second inlet port 112 is located in a periphery of one of the two generally parallel and flat surfaces of the housing 110. Further, the first inlet port and the liquid outlet port 113 may be located on oppositely on the side of the housing 110 but are not limited thereto.

As shown in FIG. 3, the recycler 100 also includes a liquid level sensor 140 and a gravitational direction detection sensor 150, which will be described in greater detail in association with FIG. 4B. Further, a supply pump 50 similar to that in FIG. 1, is also shown connected to the liquid outlet port 113.

A gas-liquid mixture from the stack 20 and high concentration methanol from the cartridge 30 respectively enter through the first and second inlet ports 111 and 112, and liquid and gas which are centrifugally separated due to the rotation of the rotor 120 are respectively discharged through the liquid outlet port 113 and the gas outlet port 114. Although the recycler 100 is supplied with the high concentration methanol from the cartridge 30, the recycler 100 need not be supplied with the high concentration methanol from the cartridge 30 such that high concentration methanol may be mixed with the liquid discharged from the liquid outlet port 113 in a storage tank similar to as shown in FIG. 1.

A sufficiently narrow gap d of about 0.2 to 1 mm is formed between the rotor 120 and an inner wall of the housing 110, and the rotor 120 has a shape similar to the internal shape of the housing 110 such that the rotor includes a portion facing an upper surface, a portion facing side surfaces, and a portion facing a lower surface of the housing 110. The narrow gap d prevents liquid from flowing to the gas outlet port 114 and facilitates quick transmission of a centrifugal force to the liquid. That is, the narrow gap d is formed in order to effectively transmit a centrifugal force generated by rotation of the rotor 120 to liquid components of the gas-liquid mixture when the gas-liquid mixture is injected into the narrow gap d between the rotor 120 and the housing 110 from the stack 20. Through such operation, the liquid component in the gas-liquid mixture is rapidly separated from the gas and moved in an outer direction away from the axis of rotation of the rotor 120, and thus the liquid component does not flow into the gas outlet port 114 formed in the center of the housing 110. The rotor 120 has a shape to achieve uniform gas-liquid separation regardless of the orientation of the recycler 100. That is, regardless of the orientation of the recycler 100, when liquid contacts the inner wall of the housing 110 due to gravity, the rotor 120 simultaneously applies a centrifugal force on the liquid from and is moved in an outer direction of the rotor 120.

As shown in FIG. 4A, the rotor 120 may be hollow and have a structure in which many holes are formed on an outer circumference of the rotor 120. In this way, an amount of liquid that can be accommodated in the housing 110 can be increased. Further, in FIG. 4A, the housing 110 of a recycler 200 has a generally cylindrical shape. Internally, the housing accommodates the similarly shaped rotor 120 so that appropriate centrifugal force may be applied to the gas-liquid mixture entering the first inlet port 111 to separate the liquid from the gas. Moreover, the motor 130 is shown, in FIG. 4A, to be at least partially disposed in the housing 110 so as to decrease the size of the recycler 100 but the motor 130 is not limited thereto. The motor 130 is connected to and rotates the rotor 120 to apply centrifugal force to the gas-liquid mixture. The rotor 120 may have any number of shapes to sufficiently separate the liquid from the gas, but is shown having a three-dimensional cobweb-like shape or an open, generally cylindrical shape. A generally flat, circular surface of the rotor 120 corresponds to an internal side of the generally flat surface of the housing 110 in which the gas outlet port 114 is disposed. The generally flat, circular surface of the rotor 120 may have a plurality of holes disposed therein. Further, the rotor 120 has a side surface to correspond to an internal surface of the side of the housing 110. The side surface of the rotor 120 may also have a plurality of holes disposed therein. Finally, the rotor 120 has another generally flat, circular surface to correspond to an internal surface of the other generally flat surface of the housing 110 in which the motor 130 is disposed. As shown in FIG. 4A and as the motor 130 is disposed at least partially, the other generally flat, circular surface of the rotor 120 includes a hole to accommodate the motor 130. When the motor 130 is not disposed in the housing 110 as shown in FIG. 4A, the other generally flat, circular surface of the rotor 120 need not include the hole to accommodate the motor 130 and may be similar to the generally flat, circular surface of the rotor 120 that corresponds to the internal side of the generally flat surface of the housing 110 in which the gas outlet port 114 is disposed.

The housing 110 may be formed of a metal having high thermal conductivity because a gas-liquid mixture entering the housing 110 from the stack 20 normally has a temperature of 60 to 65° C.; however, when the temperature of the gas-liquid mixture is high, the liquid can be included in the gas, and thus, the amount of liquid that can be discharged together with the gas through the gas outlet port 114 can be increased. Therefore, if the housing 110 is formed of a metal in order to facilitate heat dissipation, the temperature of the gas-liquid mixture can be decreased. Thus, the amount of liquid included in the gas can be decreased, and accordingly, the amount of fuel leaving together with the gas can be decreased. Also, the metal should not be reactive with methanol. The housing 110 may have a thickness of 0.2 to 0.5 mm. Fins and/or a cooling fan may further be included on an outside of the housing 110 to increase cooling efficiency. In this manner, water recovery efficiency can be increased by decreasing the temperature of the gas-liquid mixture in the recycler 100, and furthermore, without the additional heat exchanger 80, the recycler 100 can perform the gas-liquid separation function and the heat exchanging function.

As shown in FIG. 4B, the housing 110 of a recycler 300 again has a generally cylindrical inside while the outside may include a flat side but need not. The gas outlet port 114 is centrally located in one of the generally flat surfaces of the housing 110, and, while not shown, the motor 130 is located in the other of the generally flat surfaces of the housing 110. Further, the second inlet port 112 and the liquid outlet port 113 are located peripherally in one of the generally flat surfaces of the housing 110, but neither is limited thereto. The recycler may further include a level sensor 140 to measure a liquid level in the housing 110. The level sensor 140 is not disposed in a gravitational direction; however, the level sensor 140 is disposed in a radial direction of the rotor 120. Liquid is filled from an inner surface of the side of the housing 110 due to the centrifugal force generated by the rotation of the rotor 120 by the motor 130 and thereby establishes a peripheral depth, i.e., the depth of the liquid with reference to the inner surface of the side or inside periphery of the housing 110. Thus, when the liquid level is low, liquid is detected at an outer side or peripheral side of the level sensor 140, and when the liquid level increases, liquid is detected at both the outer side and the central side of the level sensor 140.

The recycler 300 may further include a gravitational direction detection sensor 150 to detect a gravitational direction. The inclusion of the gravitational direction detection sensor 150 saves power, and a method of using the gravitational direction detection sensor 150 will be described in detail later.

When the recycler 300 having the above configuration is operated, a gas-liquid mixture from the stack 20 and high concentration methanol from the cartridge 30 respectively enter the housing 110 through the first and second inlet ports 111 and 112. As the gas-liquid mixture enters the housing 110, the rotor 120 starts to be rotated by the motor 130. Then, the gas-liquid mixture begins to rotate in the rotation direction of the rotor 120. Upon rotation of the rotor 120, the liquid, which is denser than the gas, flows towards outer regions of the housing 110 and the gas concentrates in the center of the housing 110. In such state, when a supply pump 50 is operated, the liquid is separated from the gas, that is, low concentration methanol, in which methanol and water are appropriately mixed, is sent to the stack 20 through the liquid outlet port 113, and the gas separated from the liquid is exhausted to the outside of the housing 110 through the gas outlet port 114. However, aspects of the present invention need not be limited thereto such that, if there is no high concentration methanol supplied to the recycler 300, the liquid containing methanol may be sent through the liquid outlet port 113 to a storage tank (similar to storage tank 70 of FIG. 1) to be mixed with high concentration methanol to an appropriate methanol concentration before being sent to the stack 20. Further, water may be added to the recycler to adjust the concentration of the methanol to be supplied to the storage tank 70 or the stack 20. Since such separation in the recycler 300 uses centrifugal force generated by the rotation of the rotor 120, the separation can be continued regardless of the orientation of the housing 110.

In the case that the discharge direction of the liquid outlet port 113 can be aligned with the gravitational direction, a natural phase separation due to gravity still occurs even though the rotor 120 is not operated. The rotor 120 may be stopped when the liquid outlet port 113 is aligned with the direction of gravity to decrease power consumption of the motor 130. Thus, power can be saved. The gravitational direction detection sensor 150 detects whether the discharge direction of the liquid outlet port 113 is aligned with the gravitational direction. Further, the recycler 300 need not be limited thereto such that the recycler 300 may separate the liquid from the gas-liquid mixture according to gravity despite not being aligned completely with the gravitational direction, i.e., the alignment of the liquid outlet port 113 need only be sufficiently aligned with the gravitational direction to separate the liquid from the gas-liquid mixture in order to stop the rotor 120 and save power. The gravitational direction detection sensor 150 may be activated to save power and be sequentially performed as indicated in the flowchart of an operation method of the recycler according to aspects of the present invention, as shown in FIG. 5.

Figure 5:
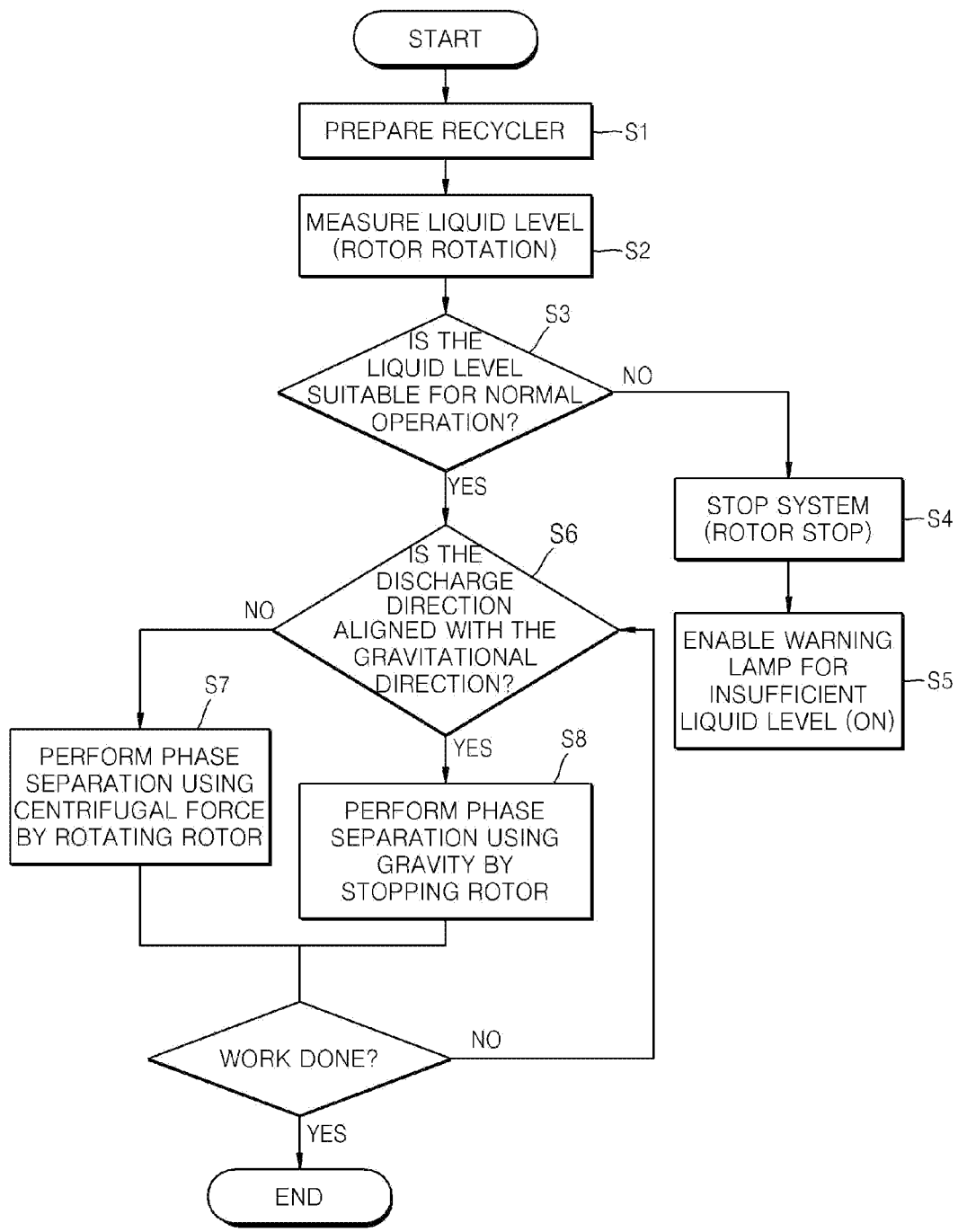
FIG. 5 is a flowchart for explaining a method of the recycler of FIG. 3, according to an embodiment of the present invention.

FIG. 5 is a flowchart of an operation method of the recycler 100 of FIG. 3, according to an embodiment of the present invention; however, such method may apply to all embodiments and aspects of the present invention. First, as described above, the recycler 100 that performs gas-liquid separation using centrifugal force generated by the rotor 120 in the housing 110 and includes the gravitational direction detection sensor 150 is prepared (S1). Prior to performing the gas-liquid separation operation, a liquid level in the housing 110 is measured by the level sensor 140 while rotating the rotor 120 (S2) in order to prevent gas from entering the stack 20 because if the liquid outlet port 113 is opened when the liquid level in the housing 110 is very low, a large amount of gas, sufficient to adversely affect the stack 20, can enter the stack 20 through the liquid outlet port 113. Thus, the liquid level in the housing 110 is measured in terms of whether the liquid level is at a normal operation level (S3). If the liquid level is not at a normal operation level, the operation of the rotor 120 is stopped (S4), and a warning lamp is enabled to indicate an insufficient liquid level (S5). However, aspects of the present invention are not limited thereto such that high concentration methanol and/or water may be supplied to the recycler 100 to increase the liquid level therein so as to continue operation of the system.

Otherwise, if the liquid level is determined to be at a normal operation level in operation S3, the discharge direction of the liquid outlet port 113 is detected in terms of whether the discharge direction of the liquid outlet port 113 is aligned with the gravitational direction using the gravitational direction detection sensor 150 (S6). However, aspects of the present invention are not limited thereto, and the alignment can be set as being a predetermined angle between the discharge direction of the liquid outlet port 113 and the gravitational direction, i.e., the discharge direction of the liquid outlet port 113 need not be directly or substantially aligned with the gravitational direction.

If it is determined that the discharge direction of the liquid outlet port 113 is not aligned with the gravitational direction in operation S6, the gas-liquid separation is performed by rotating the rotor 120 as described above (S7). Again, however, the discharge direction of the liquid outlet port 113 need not be directly or substantially aligned with the gravitational direction to use gravity to separate the liquid from the gas. Otherwise, if it is determined that the discharge direction of the liquid outlet port 113 is aligned with the gravitational direction in operation S6, the natural phase separation is performed using gravity without rotating the rotor 120, and thus, power consumption is decreased by the recycler 100.

In the case of a mobile apparatus, the orientation of the housing 110 can be occasionally changed, and thus, whether the rotor 120 is rotated can be determined by continuously measuring the direction of gravity.

Figure 6:
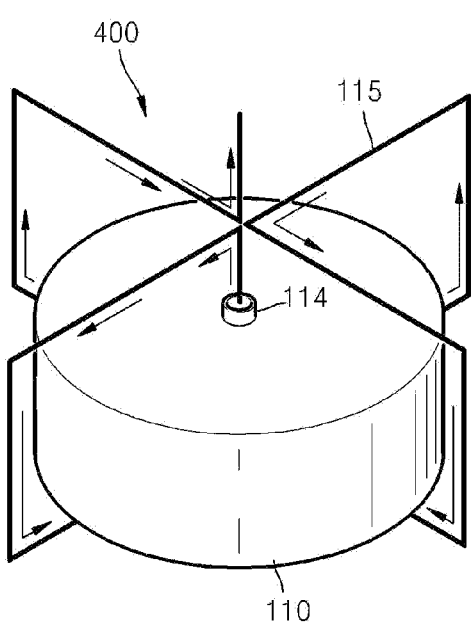
FIG. 6 is a perspective view showing the configuration of a gas outlet port of the recycler of FIG. 3, according to an embodiment of the present invention.

When the natural phase separation is performed using gravity without rotating the rotor 120 as described above, if the orientation of the housing 110 is suddenly changed, there is a risk that an amount of liquid can flow into the gas outlet port 114 during the time required for the gravitational direction detection sensor 150 to detect the sudden change in orientation of the housing 110 and start to rotate the rotor 120. In order to remove such risk, as depicted in FIG. 6, a discharge path 115, which is connected to the gas outlet port 114, may be bent around the housing 110 so that the discharge direction of the discharge path 115 is bent at least once. That is, if the discharge direction of the discharge path 115 is bent at an angle, i.e., the discharge path is 115 not a straight discharge path, a sudden flow of a large amount of liquid into the gas outlet port 114 can be prevented from flowing completely through the discharge path 115 even though there is a sudden orientational change of the housing 110. Since the DMFC can be oriented in various directions by the user regardless of whether the DMFC is operating, the bent discharge path 115, as depicted in FIG. 6, prevents the risk a large amount of liquid from entering into the gas outlet port 114 and flowing completely through the discharge path 115.

With specific regard to FIG. 6, the discharge path 115 of a recycler 400 is bent around or about the housing 110 from the gas outlet port 114. Although the discharge path 115 described and illustrated herein as having multiple 90° bends about the housing 110, the discharge path 115 from the gas outlet port need not be limited thereto such that one bend may be sufficient to prevent a flow of an amount of liquid from the gas outlet port 114 through the discharge path 115. As shown in FIG. 6, the gas discharge port 114 is centrally located in a flat surface of the generally cylindrical housing 110. The discharge path 115 bends and extends radially from the gas outlet port 114. The discharge path 115 bends about the periphery of the flat surface of the generally cylindrical housing 110 to extend down a side thereof. The discharge path 115 bends again to extend along an opposite side of the generally cylindrical housing 110 along another generally flat surface opposite the generally flat surface in which the gas outlet port 114 is disposed. The discharge path 115 then bends again at the periphery of the other generally flat surface to extend along the side of the generally cylindrical housing 110 toward the generally flat surface in which the gas outlet port 114 is disposed. The discharge path 115 then bends toward the gas outlet port 114 to extend toward the center region from the periphery of the generally flat surface in which the gas outlet port 114 is disposed. Near the center region, the discharge path 115 bends toward the periphery again, bends along the side of the generally cylindrical housing 110 at the periphery of the generally flat surface, bends along the other generally flat surface to extend thereacross, bends again at the periphery of the other generally flat surface to extend along the side of the housing 110, and bends toward the center region to bend finally to generally align with the exit from the gas outlet port 114. Each of the bends as illustrated in FIG. 6 is generally 90°; however, aspects of the present invention are not limited thereto such that the bends in the discharge path 115 may be greater than or less than 90° and need only be sufficient to prevent liquid from flowing along the discharge path 115 while the orientation of the housing 110 is changed.

As described above, a DMFC having a recycler that can be used regardless of the gravitational direction and can maintain a high performance for a time can be realized.

The recycler according to aspects of the present invention has the following and/or other advantages: First, since gas-liquid separation is performed due to a centrifugal force generated by forced rotation of a rotor, a liquid outlet port does not need to align with the gravitational direction, and thus, the recycler can be used effectively in a mobile apparatus regardless of its orientation. Second, since a membrane of which performance is rapidly reduced over time is not used, the recycler can effectively perform for a long service life. Third, since discharge paths connected to a gas outlet port are bent as described above, an unexpected liquid leakage to the gas outlet port can be prevented. Fourth, the recycler can also perform the gas-liquid separation using gravity by including a gravitational direction detection sensor to detect when a liquid outlet port of the housing is aligned with a gravitational direction even when the rotor is not operating. Fifth, an additional storage space to store liquid separated from the gas-liquid mixture need not be included as the housing of the recycler itself performs as a storage space, and thus, the volume of a DMFC can be reduced and a simple DMFC structure can be realized. Sixth, since high concentration methanol received from a cartridge can be rapidly mixed with water in the recycler due to the rotation of a rotor, methanol having a uniform concentration can be supplied to a stack.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recycler for a direct methanol fuel cell (DMFC), the recycler comprising:
    a housing in which a gas-liquid mixture recovered from a stack is accommodated, the housing having an inner wall adjacent to a perimeter thereof;
    a rotor rotatably mounted in the housing, the rotor having an outer circumference;
    a gap between the inner wall of the housing and the outer circumference of the rotor;
    a motor to rotate the rotor, wherein the recycler is configured such that when the rotor is rotated by the motor, a phase separation occurs such that liquid in the gas-liquid mixture is collected mainly in an outer region of the housing due to a centrifugal force and gas is collected in a center region of the housing;
    a gravitational direction detection sensor to detect an orientation of the housing with respect to a direction of gravity, the gravitational direction detection sensor being operationally connected to the motor to control an operation of the motor according to a detected gravitational direction;
    a first inlet port at the perimeter of the housing and extending through the inner wall thereof to direct the gas-liquid mixture into an interior of the housing, the first inlet port being so disposed relative to the housing as to direct the gas-liquid mixture into the gap between the inner wall of the housing and the outer circumference of the rotor,
    a gas outlet port through which the gas collected in the center region of the housing is discharged, and
    a discharge path connected to the gas outlet port to change the direction of the gas discharged from the gas outlet port to prevent the liquid separated from the gas-liquid mixture from being discharged with the gas separated from the gas-liquid mixture, wherein the discharge path is bent to extend completely around the housing at least one time.

2. The recycler of claim 1, wherein the housing comprises:
    a second inlet port through which a high concentration methanol enters to increase the concentration of methanol in the liquid separated from the gas-liquid mixture; and
    a liquid outlet port through which the liquid gathered in the outer region of the housing is discharged.

3. The recycler of claim 1, wherein a portion of a main body of the motor is installed in the housing.

4. The recycler of claim 1, wherein the gap between the inner wall of the housing and the outer circumference of the rotor is 0.2 to 1 mm.

5. The recycler of claim 1, wherein the rotor corresponds to the inside surfaces of the housing.

6. The recycler of claim 1, wherein the rotor includes a plurality of holes extending therethrough.

7. The recycler of claim 1, wherein the housing is formed of a metal.

8. The recycler of claim 1, wherein the housing has a thickness of 0.2 to 0.5 mm.

9. The recycler of claim 1, further comprising a level sensor configured to measure a liquid level in the housing with respect to the inner wall of the housing and in a radial direction of the rotor.

10. The recycler of claim 1, wherein the gravitational direction detection sensor is operationally connected to the motor such that the rotor is not rotated if the gravitational direction detection sensor determines that the liquid outlet port is aligned with the direction of gravity.

11. The recycler of claim 1, further comprising cooling fins disposed on an outside of the housing.

12. The recycler as claimed in claim 1, wherein the discharge path is connected to the gas outlet port, the discharge path is bent in a first direction to extend completely around the housing a first time and is bent in a second direction to extend completely around the housing a second time, the second direction being orthogonal to the first direction.

13. A direct methanol fuel cell (DMFC) system, comprising:
a fuel cell stack to generate electricity from methanol and oxygen;
a storage tank to store the methanol and in which the methanol is mixed to an appropriate concentration to be supplied to the fuel cell stack;
a cartridge to store a high concentration methanol to be mixed in the storage tank; and
a recycler to separate a gas-liquid mixture supplied from the stack, the recycler comprising:
a housing in which the gas-liquid mixture supplied from the stack is separated by centrifugal force applied to the gas-liquid mixture, the housing having an inner wall adjacent to a perimeter thereof;
a rotor rotatably mounted in the housing to apply the centrifugal force to the gas-liquid mixture, the rotor having an outer circumference;
a gap between the inner wall of the housing and the outer circumference of the rotor;
a motor to rotate the rotor,
a gravitational direction detection sensor to detect an orientation of the housing with respect to a direction of gravity, the gravitational direction detection sensor being operationally connected to the motor to control an operation of the motor according to a detected gravitational direction;
a first inlet port at the perimeter of the housing and extending through the inner wall thereof to direct the gas-liquid mixture into an interior of the housing, the first inlet port being so disposed relative to the housing as to direct the gas-liquid mixture into the gap between the inner wall of the housing and the outer circumference of the rotor,
a gas outlet port through which the gas collected in the center region of the housing is discharged; and
a discharge path connected to the gas outlet port, the discharge path being bent to extend completely around the housing at least one time,
wherein,
when the rotor is rotated by the motor, a phase separation occurs such that liquid in the gas-liquid mixture is collected at the inner wall of the housing due to the centrifugal force and gas is collected in the center region of the housing, and
the liquid separated in the recycler from the gas-liquid mixture is supplied to the storage tank.

14. A method of operating a recycler for a DMFC, comprising:
providing a recycler comprising a housing in which a gas-liquid mixture recovered from a stack is separated by centrifugal force or by gravity applied to the gas-liquid mixture, the recycler including a rotor rotatably mounted in the housing and a motor to rotate the rotor and a gravitational direction detection sensor to detect an orientation of the housing with respect to a direction of gravity, wherein the gravitational direction detection sensor is operationally connected to the motor to control an operation of the motor according to a detected gravitational direction, and the housing including a first inlet port configured to inject a gas-liquid mixture into a gap between an inner wall of the housing and an outer circumference of the rotor, a gas outlet port through which the gas collected in the center region of the housing is discharged, and a discharge path connected to the gas outlet port to change the direction of the gas discharged from the gas outlet port to prevent the liquid separated from the gas-liquid mixture from being discharged with the gas separated from the gas-liquid mixture, wherein the discharge path is bent to extend completely around the housing at least one time;
detecting whether the discharge direction of a liquid outlet port is aligned with a gravitational direction; and
applying centrifugal force to the gas-liquid mixture if the discharge direction of the liquid outlet port is not sufficiently aligned with the gravitational direction to separate the gas-liquid mixture using gravity.

15. The method of claim 14, further comprising:
opening the gas outlet port to discharge gas separated from the gas-liquid mixture; and
opening the liquid outlet port provided in an outer region of the housing to discharge liquid separated from the gas-liquid mixture.

16. The method of claim 15, further comprising detecting a liquid level in the housing to determine whether the liquid level is suitable for a normal operation before opening the liquid outlet port.

17. The method of claim 14, wherein the discharge path is bent several times around the housing.

18. The method of claim 14, further comprising separating the liquid and the gas from the gas-liquid mixture using gravity if the liquid outlet port is sufficiently aligned with the detected direction of gravity.

19. The method of claim 14, further comprising measuring a liquid level in the housing to determine if the liquid level is sufficient for a normal operation.

20. The method of claim 19, further comprising not applying centrifugal force to the gas-liquid mixture if the liquid level is determined to be insufficient.

21. The method of claim 19, further comprising generating a warning if the liquid level is determined to be insufficient.

22. The method of claim 14, wherein the rotor applies the centrifugal force to the gas-liquid mixture.

* * * * *